US012726320B2

(12) United States Patent
Murayama et al.

(10) Patent No.: US 12,726,320 B2
(45) Date of Patent: Sep. 1, 2026

(54) RADIO COMMUNICATION METHOD, AND RADIO COMMUNICATION SYSTEM

(71) Applicant: NTT, Inc., Tokyo (JP)

(72) Inventors: Daisuke Murayama, Tokyo (JP); Shota Nakayama, Tokyo (JP)

(73) Assignee: NTT, Inc., Tokyo (JP)

( * ) Notice: Subject to any disclaimer, the term of this patent is extended or adjusted under 35 U.S.C. 154(b) by 377 days.

(21) Appl. No.: 18/564,000

(22) PCT Filed: Jun. 18, 2021

(86) PCT No.: PCT/JP2021/023229
§ 371 (c)(1),
(2) Date: Nov. 24, 2023

(87) PCT Pub. No.: WO2022/264412
PCT Pub. Date: Dec. 22, 2022

(65) Prior Publication Data
US 2024/0243887 A1 Jul. 18, 2024

(51) Int. Cl.
*H04L 5/00* (2006.01)
*H04L 5/14* (2006.01)
(Continued)

(52) U.S. Cl.
CPC ............ *H04L 5/006* (2013.01); *H04L 5/0064* (2013.01); *H04L 5/14* (2013.01); *H04W 72/0446* (2013.01); *H04W 72/563* (2023.01)

(58) Field of Classification Search
CPC ......... H04L 5/006; H04L 5/0064; H04L 5/14; H04W 72/0446; H04W 72/563
See application file for complete search history.

(56) References Cited

U.S. PATENT DOCUMENTS

2014/0023004 A1 1/2014 Kumar et al.
2015/0055520 A1* 2/2015 Sahara ................. H04L 5/0025 370/280

(Continued)

FOREIGN PATENT DOCUMENTS

JP 2020-014238 1/2020
JP 2020-202428 12/2020
WO 2016/030953 3/2016

OTHER PUBLICATIONS

Qualcomm Japan G. K., "Regarding asynchronous operation of local 5G," Mar. 16, 2020, Ministry of Internal Affairs and Communications, [retrieved on Jun. 3, 2021], Internet <URL: https://www.soumu.go.jp/main_content/000676472.pdf>.

*Primary Examiner* — Dady Chery
(74) *Attorney, Agent, or Firm* — IPUSA, PLLC

(57) ABSTRACT

Provided is a radio communication method to be performed by a radio communication system using a TDD scheme, the radio communication method including: an acquisition step of acquiring a TDD configuration of another radio communication system that might have an overlapping communication area; a determination step of determining priorities of slots of the radio communication system, based on the acquired TDD configuration, such that a priority of a first slot, in which an uplink slot timing and a downlink slot timing overlap those of the another radio communication system, is lower than a priority of a second slot, in which the uplink slot timing and the downlink slot timing do not overlap those of the another radio communication system; and an allocation step of allocating resources to the slots of the radio communication system according to the priorities of the slots.

6 Claims, 9 Drawing Sheets

(51) Int. Cl.
*H04W 72/0446* (2023.01)
*H04W 72/563* (2023.01)

(56) References Cited

U.S. PATENT DOCUMENTS

| | | | | |
|---|---|---|---|---|
| 2015/0365941 | A1* | 12/2015 | Liu | H04L 5/14 370/280 |
| 2016/0366661 | A1* | 12/2016 | Yoshizawa | H04W 56/0065 |
| 2017/0135143 | A1 | 5/2017 | Suda et al. | |
| 2020/0106576 | A1* | 4/2020 | Kimura | H04L 5/0012 |
| 2021/0250910 | A1* | 8/2021 | Park | H04L 5/0044 |
| 2021/0321416 | A1* | 10/2021 | Gaal | H04L 5/14 |
| 2022/0240272 | A1* | 7/2022 | Tokuyasu | H04W 72/23 |

* cited by examiner

RADIO COMMUNICATION METHOD, AND RADIO COMMUNICATION SYSTEM

TECHNICAL FIELD

The present invention relates to a radio communication method and a radio communication system.

BACKGROUND ART

A technique for reducing interference between channels in a time division duplex (TDD) radio communication system is known (see, for example, PTL 1).

In addition, in a local 5th generation (5G) system, it is known that interference is produced between a base station and a mobile station when the start timings of radio frames or the uplink and downlink communication patterns do not match, resulting in deterioration of communication quality (see, for example, NPL 1).

CITATION LIST

Patent Literature

PTL 1: Unexamined Japanese Patent Application Publication No. 2020-202428

Non-Patent Literature

NPL 1: Qualcomm Japan G. K., "Regarding asynchronous operation of local 5G," Mar. 16, 2020, Ministry of Internal Affairs and Communications, [retrieved on Jun. 3, 2021], Internet <URL: https://www.soumu.go.jp/main_content/000676472.pdf>

SUMMARY OF INVENTION

Technical Problem

In a radio communication system using a TDD scheme, interference between an uplink slot and a downlink slot has a problem that communication quality such as when a signal-to-interference-plus-noise ratio (SINR) characteristic deteriorates greatly compared to when interference is produced between uplink slots or between downlink slots.

An embodiment of the present invention has been made in view of the foregoing, and therefore aims to reduce the deterioration of communication quality due to interference between an uplink slot and a downlink slot in a radio communication system using a TDD scheme.

Solution to Problem

In order to solve the above problem, according to an embodiment of the present invention, there is provided a radio communication method to be performed by a radio communication system using a TDD scheme, the radio communication method including: an acquisition step of acquiring a TDD configuration of another radio communication system that might have an overlapping communication area; a determination step of determining priorities of slots of the radio communication system, based on the acquired TDD configuration, such that a priority of a first slot, in which an uplink slot timing and a downlink slot timing overlap those of the another radio communication system, is lower than a priority of a second slot, in which the uplink slot timing and the downlink slot timing do not overlap those of the another radio communication system; and an allocation step of allocating resources to the slots of the radio communication system according to the priorities of the slots.

Advantageous Effects of Invention

According to the embodiment of the present invention, it is possible to reduce the deterioration of communication quality due to interference between an uplink slot and a downlink slot in a radio communication system using a TDD scheme.

DESCRIPTION OF EMBODIMENTS

Hereinafter, an embodiment of the present invention (the present embodiment) will be described with reference to the drawings. The embodiment described below is simply an example, and embodiments to which the present invention is applicable are by no means limited to the following embodiment.

<System Structure>

Figure 1:
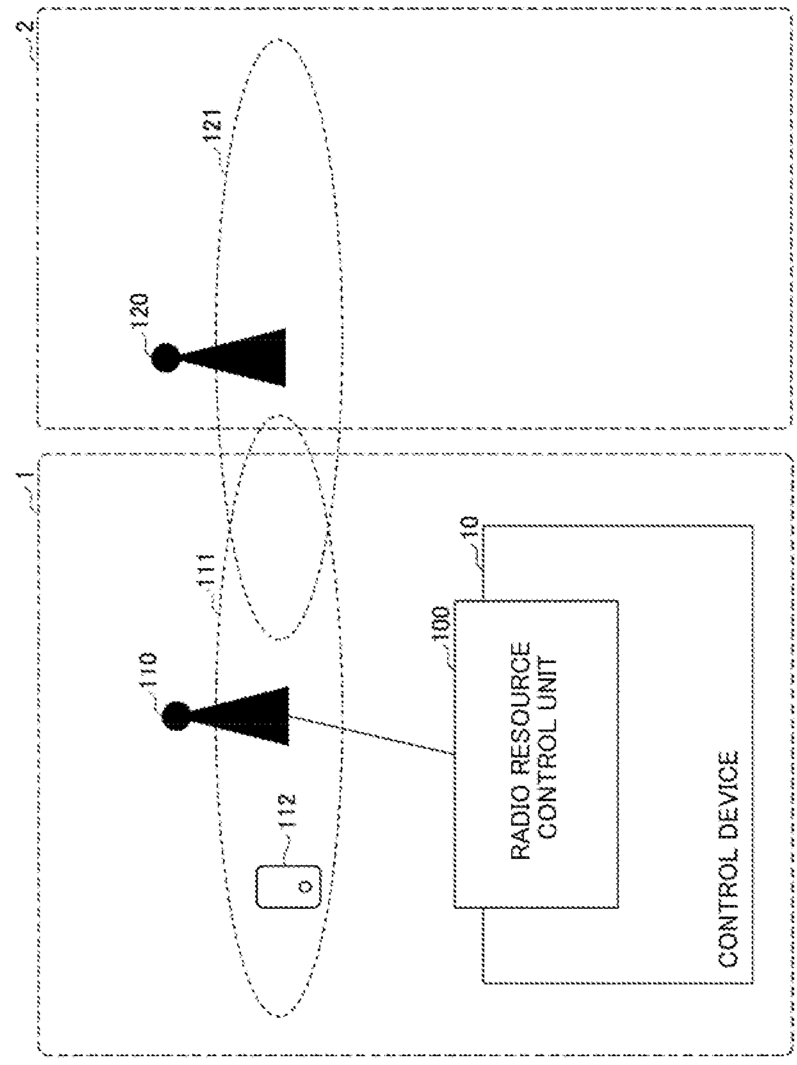
FIG. 1 is a diagram illustrating an example system structure of a radio communication system according to the present embodiment.

FIG. 1 is a diagram illustrating an example system structure of a radio communication system according to the present embodiment. A radio communication system 1 is, for example, a time division duplex (TDD) radio communication system such as 5th generation (5G), and includes a control device 10, a radio resource control unit 100, a base station 110, a mobile station 112, and the like.

The control device 10 is a device for controlling one or more base stations 110 or a system including a plurality of devices. The radio resource control unit 100 is included in the control device 10, for example, and exercises centralized control over allocation of radio resources of one or more base stations 110. The base station 110 communicates with one or more mobile stations 112 by, for example, TDD radio communication such as 5G. The mobile station 112 is, for example, a mobile radio station carried by a user or the like.

The control device 10 and the radio resource control unit 100 may be positioned in the vicinity of the base station 110, or may be positioned in a remote place via a network. It is desirable that the base station 110 and the control device 10 could be communicably connected by wired communication such as an optical transmission network. However, the present invention is not limited thereto, and the base station 110 and the control device 10 may be communicably connected by radio communication such as integrated access backhaul (IAB) or Wigig, for example.

A radio communication system 2 is an example of another radio communication system that might have a communication area overlapping that of the radio communication system 1. The example illustrated in FIG. 1 illustrates that part of a communication area 111 of the base station 110 of the radio communication system 1 and part of a communication area 121 of a base station 120 of the other radio communication system 2 overlap.

Problem

Figure 2A:
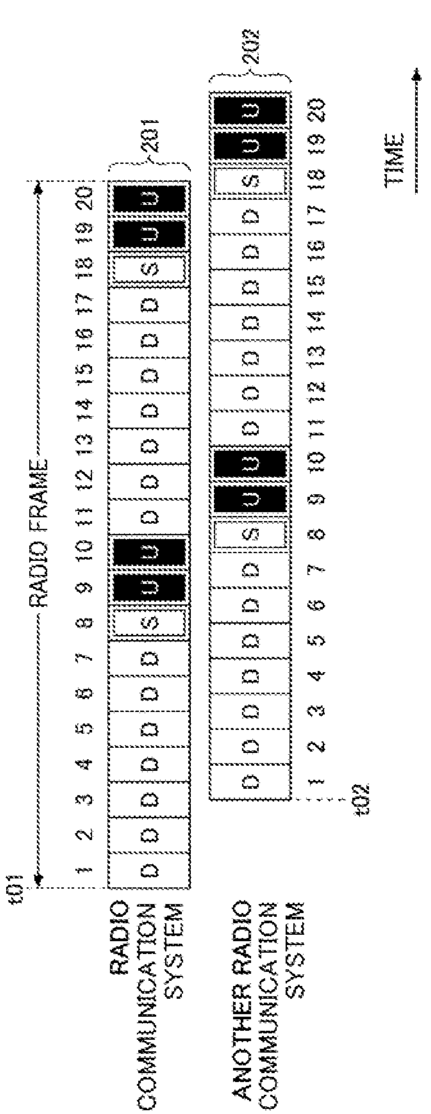
FIG. 2A is a diagram (1) for describing a problem the present embodiment aims to solve.
Figure 2B:
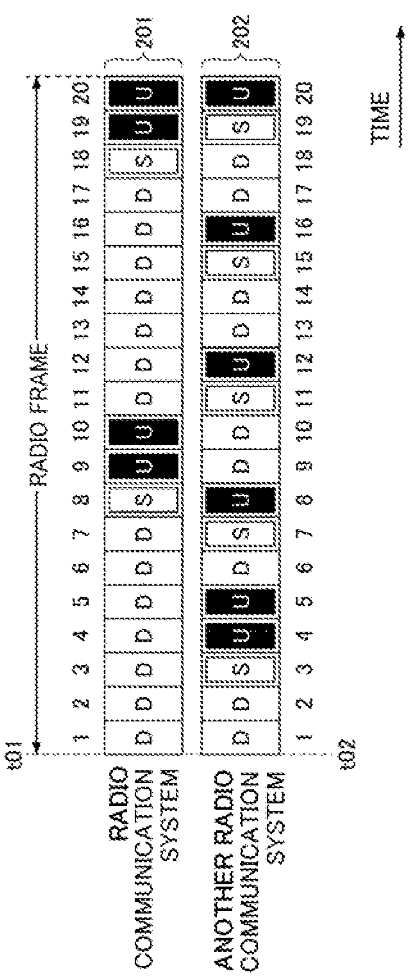
FIG. 2B is a diagram (2) for describing a problem the present embodiment aims to solve.

FIGS. 2A and 2B are diagrams for describing problems the present embodiment aims to solve. NPL 1 explains that, in local 5G, when the start timings of radio frames or the communication patterns of uplink and downlink do not match between two radio communication systems having communication areas that might overlap, interference is produced between a base station and a mobile station.

FIG. 2A illustrates an example of a TDD uplink-downlink configuration (hereinafter referred to as a "TDD configuration") when the start timing of a radio frame in the radio communication system 1 is different from the start timing of a radio frame in the other radio communication system 2.

In the example illustrated in FIG. 2A, the radio communication system 1 starts a radio frame at time t01, and the other radio communication system 2 starts a radio frame at time t02, which is different from time t01. Also, each "D" in these radio frames indicates a downlink slot (Downlink), "U" indicates an uplink slot (Uplink), and "S" indicates a special slot including a switching period from a downlink slot to an uplink slot. The numbers 1 to 20 indicate slot numbers.

In the example illustrated in FIG. 2A, a TDD configuration 201 of the radio communication system 1 and a TDD configuration 202 of the other radio communication system 2 have matching communication patterns, both represented by "D," "U," and "S," but their start timings do not match.

In this case, for example, it can be seen that the timings of uplink slots with slot numbers 9, 10, 19, and 20 in the radio communication system 1 and the timings of downlink slots with slot numbers 6, 7, 16, and 17 in the other radio communication system 2 overlap at least partially. Similarly, it can be seen that the timings of downlink slots with slot numbers 11 and 12 in the radio communication system 1 and the timings of uplink slots with slot numbers 9 and 10 in the other radio communication system 2 overlap at least partially.

FIG. 2B illustrates an example of a TDD configuration when the communication pattern of the radio communication system 1 is different from the communication pattern of the radio frame of the other radio communication system 2.

In the example illustrated in FIG. 2B, the radio communication system 1 starts a radio frame at time t01, and the other radio communication system 2 starts a radio frame at time t02, which is the same as time t01. That is, the timing that the radio frame starts match between the radio communication system 1 and the other radio communication system 2. On the other hand, the communication pattern represented by "D," "U," and "S" does not match between the TDD configuration 201 of the radio communication system 1 and the TDD configuration 202 of the other radio communication system 2.

In this case, for example, it can be seen that the timings of uplink slots with slot numbers 9 and 10 in the radio communication system 1 and the timings of downlink slots with slot numbers 9 and 10 in the other radio communication system 2 overlap. Similarly, it can be seen that the timings of downlink slots with slot numbers 4, 5, 12, and 16 in the radio communication system 1 and the timings of uplink slots with slot numbers 4, 5, 12, and 16 in the other radio communication system 2 overlap.

In this way, in the radio communication system 1 and the other radio communication system 2, when the timing to start a radio frame or the pattern of uplink and downlink communication does not match, the timings of uplink slots and downlink slots overlap, causing interference. In the radio communication system 1 using a TDD scheme, interference between uplink slots and downlink slots greatly deteriorates communication quality such as an SINR characteristic compared to when interference is produced between uplink slots or between downlink slots.

When uplink signals collide with each other or downlink signals collide with each other, separation is possible to some extent if the device is designed to operate by taking SINR into account. For example, in a 5G radio communication system, reference signals or synchronization signals may be orthogonalized between uplink signals or downlink signals, so that it is possible to reduce the deterioration of SINR when they collide with each other.

On the other hand, when an uplink signal and a downlink signal collide with each other, the deterioration of SINR cannot be reduced by the same method. In particular, the SINR at the mobile station 112 may deteriorate greatly depending on the position of the mobile station 112.

Therefore, the radio communication system 1 according to the present embodiment has a function of reducing the deterioration of communication quality due to interference between uplink slots and downlink slots.

Overview of Present Embodiment

Figure 3:
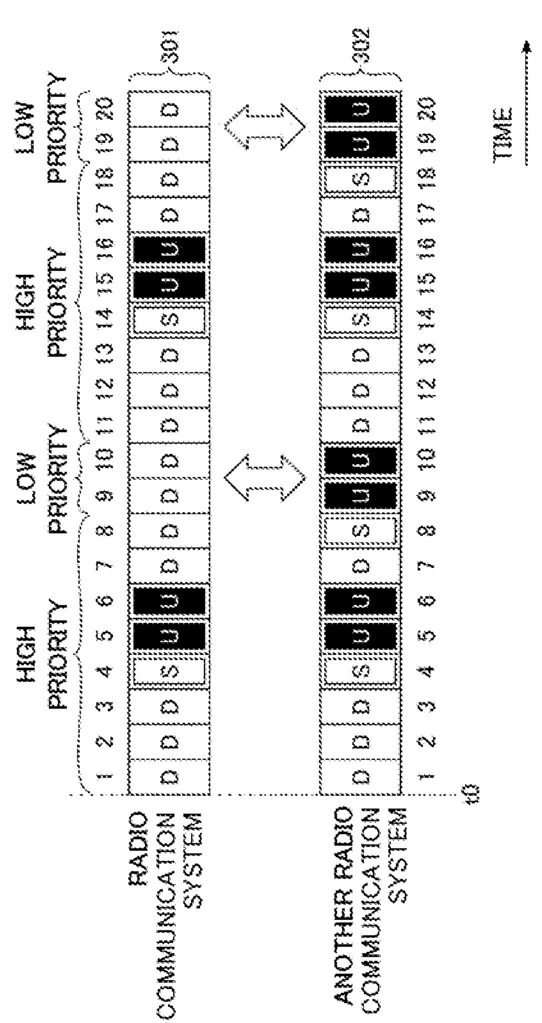
FIG. 3 is a diagram for describing an overview of the present embodiment.

FIG. 3 is a diagram for describing an overview of the present embodiment. Here, it is assumed that the other radio communication system 2 is a radio communication system that synchronizes the clock with the radio communication system 1 and uses the same frequency band. Also, it is assumed that the radio communication system 1 has a TDD configuration 301 as illustrated in FIG. 3, and the start time t0 of the radio frame matches the start time of the radio frame in the other radio communication system 2.

The radio communication system 1 according to the present embodiment allocates radio resources in the following procedures, for example.

Procedure 1) The radio communication system 1 acquires a TDD configuration 302 of another radio communication system 2 that might have an overlapping communication area. For example, the radio communication system 1 acquires the TDD configuration 302 of the other radio communication system 2 by snooping, manual input, or the like.

Procedure 2) The radio communication system 1 extracts slots (hereinafter referred to as "first slots"), where the timings of an uplink slot and a downlink slot overlap, based on the acquired TDD configuration 302. Also, the radio communication system 1 determines the priorities of slots in the radio communication system 1 such that the priority of a first slot is lower than the priority of a slot (hereinafter referred to as a "second slot") where the timings of an uplink slot and a downlink slot do not overlap.

For example, in the example illustrated in FIG. 3, the timings of downlink slots with slot numbers 9, 10, 19, and 20 in the radio communication system 1 overlap the timings of uplink slots with slot numbers 9, 10, 19, and 209 in the other radio communication system 2. Therefore, the slots with slot numbers 9, 10, 19, and 20 are the first slots. On the other hand, the slots with slot numbers 1 to 8 and 11 to 18 in the radio communication system 1 are the second slots because the timings of an uplink slot and a downlink slot do not overlap in these slots.

In this case, the radio communication system 1 determines the priority of each slot such that the priority of a first slot is set lower than the priority of a second slot, by lowering the priority of the first slot or by raising the priority of the second slot.

Procedure 3) The radio communication system 1 allocates resources to the slots of the radio communication system 1 according to each slot's determined priority. For example, the radio communication system 1 allocates resources to slots having higher slot priorities, in descending order of resources having higher packet priorities.

According to the procedures described above, since slots are used in descending order of slots having higher slot priorities (slots without interference between uplink and downlink signals), it is possible to reduce the deterioration of communication quality due to interference between uplink slots and downlink slots.

<Functional Structure of Radio Communication System>

Figure 4:
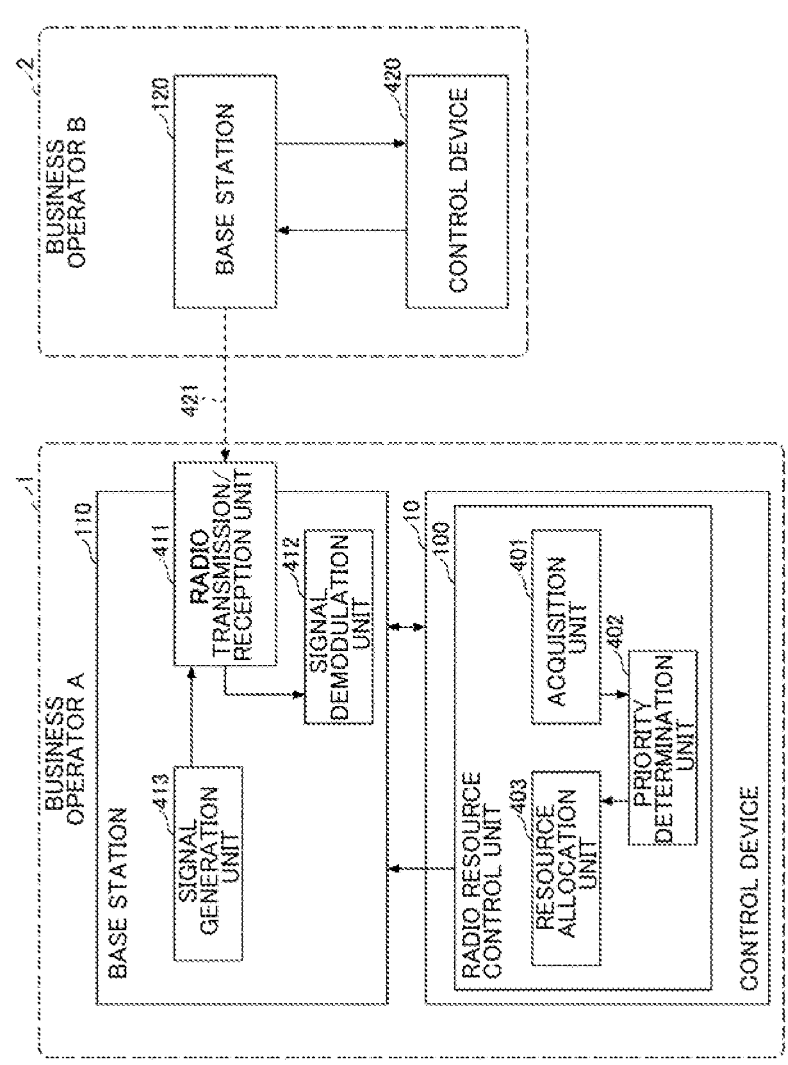
FIG. 4 is a diagram illustrating an example functional structure of the radio communication system according to the present embodiment.

FIG. 4 is a diagram illustrating an example functional structure of the radio communication system according to the present embodiment.

(Functional Structure of Control Device)

The control device 10 has, for example, a computer configuration, and the computer implements the radio resource control unit 100 by executing a predetermined program. At least some of the functions of the radio resource control unit 100 may be implemented by hardware.

The radio resource control unit 100 allocates resources to each slot of the radio frame of the radio communication system 1 by executing Procedures 1 to 3 described in FIG. 3. For example, as illustrated in FIG. 4, the radio resource control unit 100 includes an acquisition unit 401, a priority determination unit 402, and a resource allocation unit 403.

The acquisition unit 401 acquires the TDD configuration of the other radio communication system 2 that might have an overlapping communication area. For example, the acquisition unit 401 controls the base station 110 to monitor radio waves 421 transmitted by the base station 120 of the other radio communication system 2 and acquires the TDD configuration 302 of the other radio communication system 2 as illustrated in FIG. 3.

Alternatively, the acquisition unit 401 may acquire, for example, the TDD configuration 302 of the other radio communication system 2 acquired by an administrator or the like by using an air monitor or the like, by manual input by the administrator or the like, or by data output from the air monitor or the like.

When the radio communication system 1 and the other radio communication system 2 share resource allocation information (when there is coordination between base stations), the acquisition unit 401 acquires the resource allocation information from the other radio communication system 2. The resource allocation information includes, for example, information as to whether slots in which the timings of an uplink slot and a downlink slot overlap are planned to be used, the priorities, the TDD configuration, and so forth.

The priority determination unit 402 determines the priority of each slot of the radio communication system 1 such that the priority of a first slot is set lower than the priority of a second slot, based on the TDD configuration of the other radio communication system 2 acquired by the acquisition unit 401. Here, as described above, a first slot refers to a slot in which the timing of an uplink slot or a downlink slot overlaps that of the other radio communication system 2, and a second slot refers to a slot in which the timing of an uplink slot or a downlink slot does not overlap that of the other radio communication system 2.

For example, the priority determination unit 402 may determine the priority of each slot in the radio communication system 1 such that the priority of a first slot is lower than the priority of a second slot, by lowering the priority of the first slot by one level from the priority of the second slot. Alternatively, the priority determination unit 402 may determine the priority of each slot in the radio communication system 1 such that the priority of a first slot is lower than the priority of a second slot by raising the priority of the second slot by one level from the priority of the first slot.

A slot (hereinafter referred to as a "third slot") in which the timing of an uplink slot in the radio communication system 1 and the timing of a downlink slot in the other radio communication system 2 overlap may be included in the first slots. Also, a slot (hereinafter referred to as a "fourth slot") in which the timing of a downlink slot in the radio communication system 1 and the timing of an uplink slot in the other radio communication system 2 overlap may be included in the first slots.

When the first slots include a third slot and a fourth slot, the priority determination unit 402 may determine such that the priority of the third slot and the priority of the fourth slot are different. For example, the priority determination unit 402 may determine the priority of the third slot to be higher than the priority of the fourth slot. Alternatively, the priority determination unit 402 may determine the priority of the third slot to be lower than the priority of the fourth slot.

The resource allocation unit 403 allocates resources to the slots of the radio communication system 1 according to the priorities of slots determined by the priority determination unit 402. For example, the resource allocation unit 403 allocates resources to slots having higher slot priorities, in descending order of resources having higher packet priorities.

(Functional Structure of Base Station)

The base station 110 includes, for example, a radio transmission/reception unit 411, a signal demodulation unit 412, a signal generation unit 413, and the like, as illustrated in FIG. 4.

The radio transmission/reception unit 411 transmits/receives radio signals to/from one or more mobile stations 112 based on a TDD radio communication standard such as 5G, for example. Preferably, the radio transmission/reception unit 411 receives radio signals transmitted by the base station 120 of the other radio communication system 2 or transmits/receives radio signals to/from the base station 120.

The signal demodulation unit 412 demodulates the radio signals received by the radio transmission/reception unit 411 to acquire the data included in the radio signals. The signal generation unit 413 generates transmission signals according to the resource allocation from the radio resource control unit 100, and outputs the transmission signals to the radio transmission/reception unit 411.

Structured as described above, the base station 110 performs TDD radio communication under the control of the control device 10.

Note that the functional structure of the radio communication system 1 illustrated in FIG. 4 is an example. For example, in FIG. 4, part or all of the acquisition unit 401 included in the radio resource control unit 100 may be provided in the base station 110. Also, at least some of the acquisition unit 401, the priority determination unit 402, and the resource allocation unit 403 included in the radio resource control unit 100 may be provided in a device other than the base station 110 and the control device 10 included in the radio communication system 1. In short, the acquisition unit 401, the priority determination unit 402, and the resource allocation unit 403 only have to be included in the radio communication system 1, and may be provided in any device within the radio communication system 1.

The functional structure illustrated in FIG. 4 only shows functional components that are necessary for the description of the present embodiment among various functional components included in the radio communication system 1, and the base station 110 and the control device 10 may further have various functional components included in general base stations and control devices.

<Flow of Process>

Subsequently, the flow of process of the radio communication method according to the present embodiment will be described with reference to a plurality of examples.

Example 11

Figure 5:
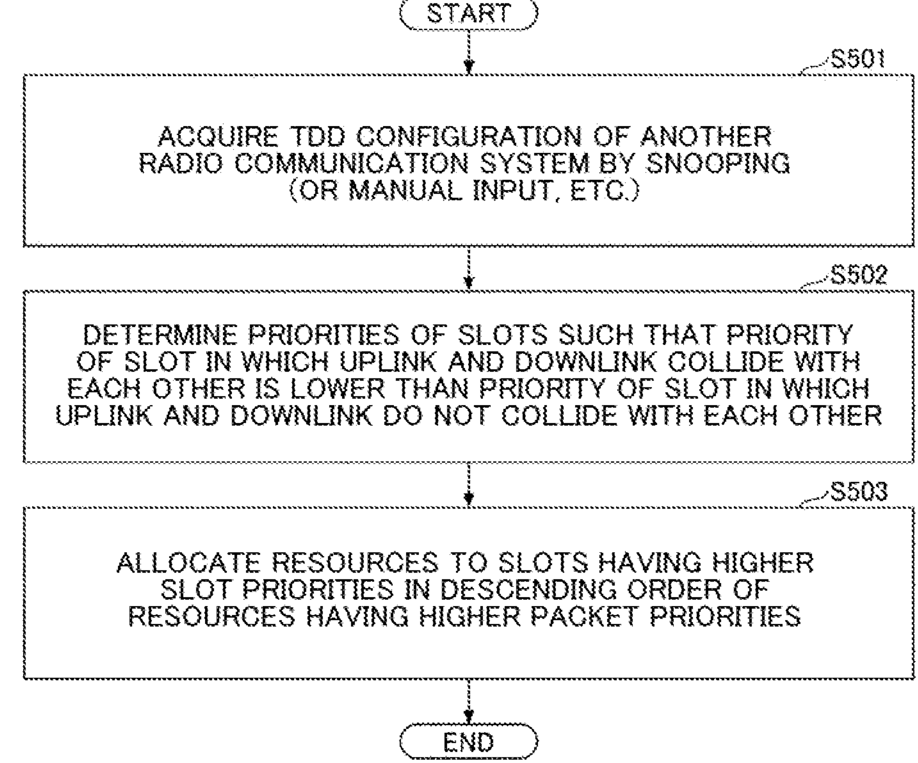
FIG. 5 is a flowchart illustrating an example process in the radio communication system according to Example 1.

FIG. 5 is a flowchart illustrating an example process in the radio communication system according to Example 1.

In step S501, the acquisition unit 401 of the radio communication system 1 acquires a TDD configuration of another radio communication system 2 that might have an overlapping communication area. For example, the acquisition unit 401 acquires the TDD configuration 302 of the other radio communication system 2 as illustrated in FIG. 3 by snooping, manual input, or the like. When acquiring the TDD configuration 302 of the radio communication system 2 by snooping, for example, the master information block (MIB) described in a physical broadcast channel (PBCH) and the downlink control information (DCI) described in a physical downlink control channel (PDCCH) of the radio communication system 2 may be decoded, and a system information block type 1 (SIB1) described in a physical downlink shared channel (PDSCH) thereof may be decoded to acquire tdd-UL-DL-ConfigurationCommon. A dedicated UE_ID or the like may be determined in advance for sharing each message, and the message may be decoded by using the UE_ID or the like. The message may be decoded by the UE of the radio communication system 1 and notified to the base station of the radio communication system 1.

In step S502, the priority determination unit 402 of the radio communication system 1 determines the priorities of slots such that, for example, the priority of a slot (first slot) in which uplink and downlink collide with each other is lower than the priority of a slot (second slot) in which uplink and downlink do not collide with each other.

Here, as described earlier, a first slot refers to a slot in which the timing of an uplink slot or a downlink slot overlaps that of the other radio communication system 2, and a second slot refers to a slot in which the timing of an uplink slot or a downlink slot does not overlap that of the other radio communication system 2.

In the example illustrated in FIG. 3, the priority determination unit 402 determines, for example, the priorities of the slots with slot numbers 9, 10, 19, and 20, in which the timing of a downlink slot in the radio communication system 1 and the timing of an uplink slot in the other radio communication system 2 overlap, to be lower than those of other slots. Alternatively, the priority determination unit 402 may determine the priorities of other slots (for example, slots with slot numbers 1 to 8 and 11 to 18) to be higher than the priorities of slots with slot numbers 9, 10, 19, and 20.

In step S503, the resource allocation unit 403 of the radio communication system 1 allocates resources to slots having higher slot priorities, in descending order of resources having higher packet priorities.

According to the process illustrated in FIG. 5, the radio communication system 1 can effectively reduce the frequency of collisions (timing overlap) between uplink signals and downlink signals, particularly when the traffic of downlink signals is relatively quiet and the line utilization rate is low. Thus, the radio communication system 1 can reduce the number of times the retransmission process takes place, and improve the utilization efficiency of the line.

Example 2

Figure 6:
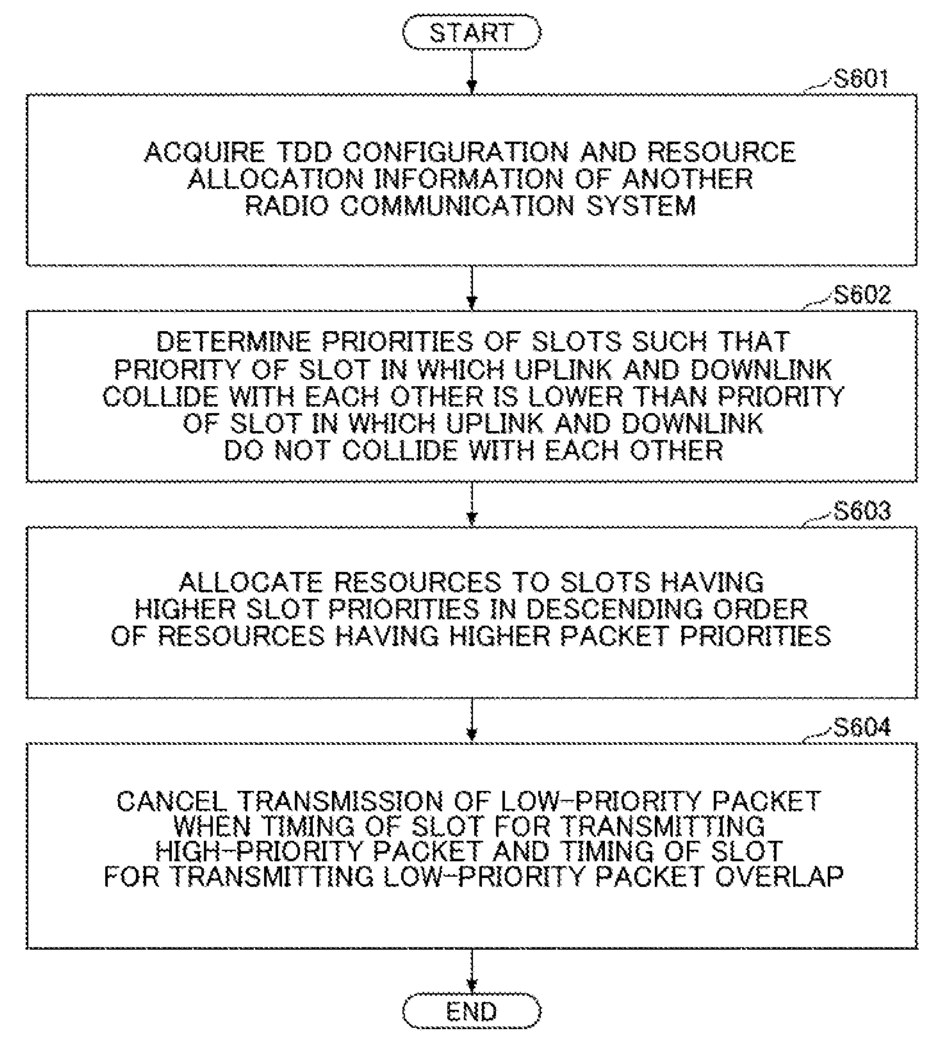
FIG. 6 is a flowchart illustrating an example process in the radio communication system according to Example 2.

FIG. 6 is a flowchart illustrating an example process in the radio communication system according to Example 2. This process illustrates an example of a process in which the radio communication system 1 shares the resource allocation status with another radio communication system 2. Here, detailed description of the process similar to that of Example 1 will be omitted.

In step S601, the acquisition unit 401 of the radio communication system 1 acquires a TDD configuration and resource allocation information of another radio communication system 2 that might have an overlapping communication area. For example, the acquisition unit 401 controls the base station 110 to transmit/receive resource allocation information (for example, information as to whether or not a resource in which uplink and downlink collide with each other is planned to be used) to/from the base station 120 of the other radio communication system 2. At this time, the TDD configuration of the other radio communication system 2 may be included in the resource allocation information.

In step S602, the priority determination unit 402 of the radio communication system 1 determines the priorities of slots by, for example, making the priority of a slot (first slot) in which uplink and downlink collide with each other lower than the priority of a slot (second slot) in which uplink and downlink do not collide with each other, as in Example 1.

In step S603, the resource allocation unit 403 of the radio communication system 1 allocates resources to slots having higher slot priorities, in descending order of resources having higher packet priorities, as in Example 1.

In step S604, when the timing of a slot in which the other radio communication system 2 transmits a high-priority packet and the timing of a slot in which the radio communication system 1 transmits a low-priority packet overlap, the resource allocation unit 403 cancels the transmission of the packet of the lower priority. Here, the low-priority packet is the packet having a lower priority than the high-priority packet.

According to the process illustrated in FIG. 5, the radio communication system 1 can effectively reduce the frequency of collisions (timing overlap) between uplink signals and downlink signals, particularly when the traffic of downlink signals is relatively quiet and the line utilization rate is low. Furthermore, the radio communication system 1 cancels the transmission of a low-priority packet when its timing overlaps a slot in which the other radio communication system 2 transmits a high-priority packet, thereby reducing the interference against the high-priority packet of the other radio communication system 2.

Example 3

Figure 7:
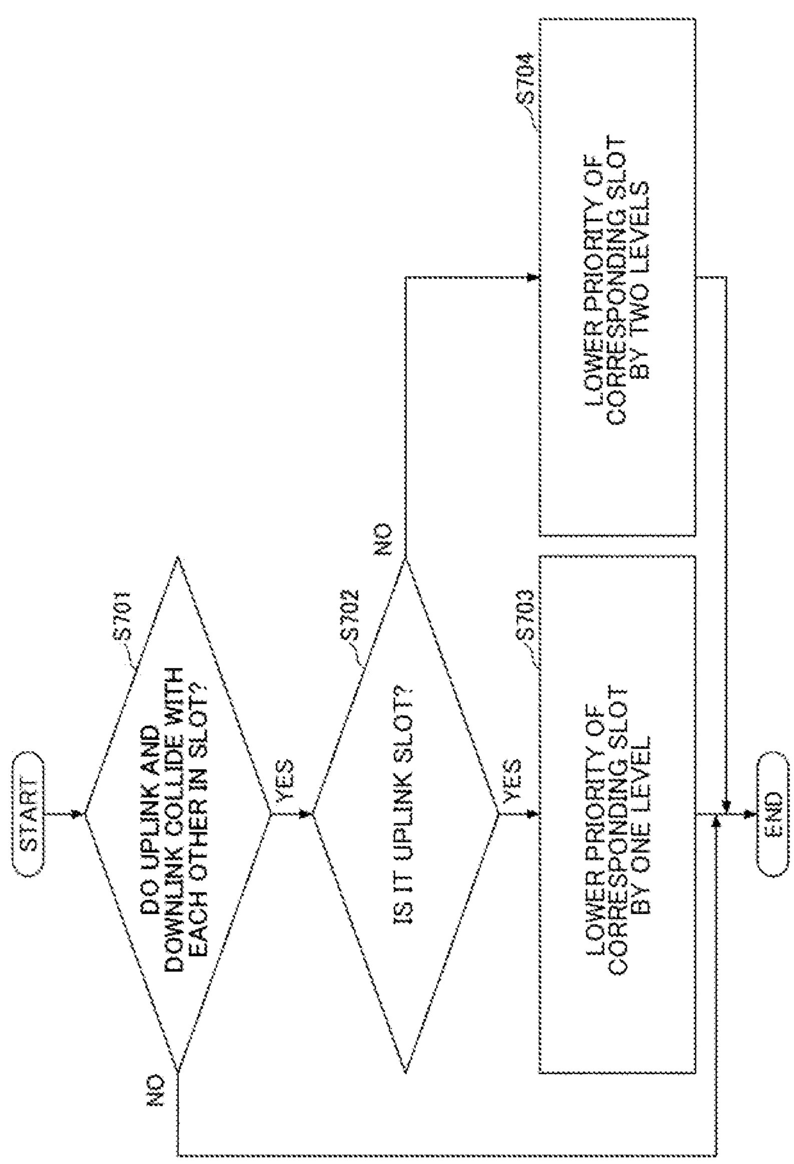
FIG. 7 is a flowchart illustrating an example priority determination process according to Example 3.

FIG. 7 is a flowchart illustrating an example priority determination process according to Example 3. This process illustrates another example priority determination process performed by the priority determination unit 402 in step S502 of FIG. 5 or step S602 of FIG. 6. The priority determination unit 402 performs the process illustrated in FIG. 7 for each slot of the radio communication system 1, for example, in step S502 of FIG. 5 or in step S602 of FIG. 6.

In step S701, the priority determination unit 402 determines whether or not uplink and downlink collide with each other in the slot to be processed (that is, whether or not the timing of an uplink slot and the timing of a downlink slot overlap in the slot). When uplink and downlink collide with each other in the slot, the priority determination unit 402 shifts the process to step S702. On the other hand, when uplink and downlink do not collide with each other in the slot, the priority determination unit 402 terminates the process illustrated in FIG. 7.

In step S702, the priority determination unit 402 determines whether this slot is an uplink slot or a downlink slot in the radio communication system 1. For example, in FIG. 2B, since uplink and downlink collide with each other in the slots with slot numbers 4 and 5 and these slots are labeled as “D” in the radio communication system 1, the priority determination unit 402 determines that these slots are downlink slots of the radio communication system 1. On the other hand, in FIG. 2B, since uplink and downlink collide with each other in the slots with slot numbers 9 and 10 and these slots are labeled as “U” in the radio communication system 1, the priority determination unit 402 determines that these slots are uplink slots of the radio communication system 1.

When these slots are uplink slots, the priority determination unit 402 shifts the process to step S703. On the other hand, when these slots are downlink slots, the priority determination unit 402 shifts the process to step S704.

When shifting to step S703, the priority determination unit 402 lowers the priority of these slots by one level from slots in which uplink and downlink do not collide with each other. On the other hand, when shifting to step S704, the priority determination unit lowers the priority of these slots by two levels from slots in which uplink and downlink do not collide with each other.

According to the process of FIG. 7, the priority determination unit 402 can determine the priorities of slots in three levels such a slot in which uplink and downlink do not collide with each other has the highest priority, and, among the slots in which uplink and downlink collide with each other, a slot in which downlink slots collide with each other has the lowest priority.

Note that the process illustrated in FIG. 7 is an example. For example, the priority determination unit 402 may determine the priorities of slots in three levels such that, among the slots in which uplink and downlink collide with each other, a slot in which uplink slots collide with each other has the lowest priority.

<Hardware Structure>

Figure 8:
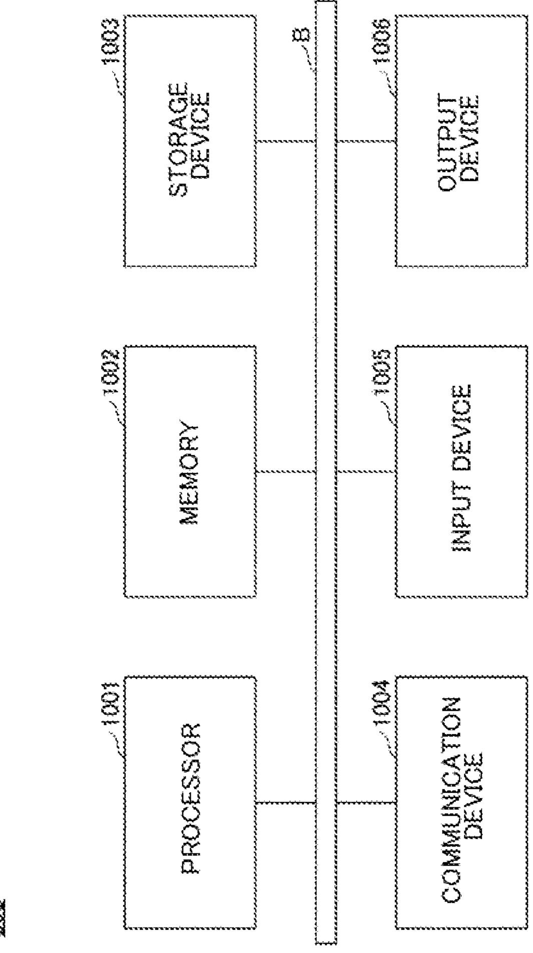
FIG. 8 is a diagram illustrating an example hardware structure of a computer.

The control device 10, the base station 110, the radio communication system 1, and the like according to the present embodiment have a hardware structure of a computer 800 as illustrated in FIG. 8, for example. In addition, the radio communication system 1 according to the present embodiment implements the acquisition unit 401, the priority determination unit 402, the resource allocation unit 403, and the like by causing one or more computers 800 to execute programs that describe the contents of processes according to the present embodiment.

The programs can be stored and distributed by being recorded in a computer-readable storage medium (portable memory or the like). Furthermore, the programs can also be provided through a network such as the Internet or an electronic mail.

FIG. 8 is a diagram illustrating an example hardware structure of a computer. In the example illustrated in FIG. 8, the computer 800 includes a processor 1001, a memory 1002, a storage device 1003, a communication device 1004, an input device 1005, an output device 1006, a bus B, and the like.

The processor 1001 is, for example, an arithmetic unit such as a central processing unit (CPU) that implements various functions by executing predetermined programs. The memory 1002 is a storage medium that is readable by the computer 800, and includes, for example, a random access memory (RAM), a read only memory (ROM), and the like. The storage device 1003 is a computer-readable storage medium, and may include a hard disk drive (HDD), a solid state drive (SSD), various optical discs, magneto-optical disks, and the like.

The communication device 1004 includes one or more pieces of hardware (transmitting/receiving devices) for communicating with other devices via a wireless or wired network. The input device 1005 is an input device (for example, keyboard, mouse, microphone, switch, button, sensor, etc.) that receives an input from the outside. The output device 1006 is an output device (for example, display, speaker, LED lamp, etc.) that transmits an output to the outside. Note that the input device 1005 and the output device 1006 may be integrated (for example, an input/output device such as a touch panel display).

The bus B is connected to each of the components described above, and transmits, for example, address signals, data signals, and various control signals. The processor 1001 may include, for example, a digital signal processor (DSP), a programmable logic device (PLD), or a field programmable gate array (FPGA) in addition to (or instead of) the CPU.

Moreover, the programs mentioned above may be ones for implementing some of the functions described above, or may be ones that can implement the functions described above in combination with programs that are pre-recorded in the computer 800. Furthermore, part or all of the functions of the radio communication system 1 may be implemented by using hardware such as a programmable logic device (PLD) or a field programmable gate array (FPGA).

Effects of Embodiment

The radio communication system 1 according to the present embodiment uses slots in descending order of slot priorities (that is, from slots in which uplink and downlink signals do not collide with each other). Therefore, particularly when the traffic of downlink signals is relatively quiet and the line utilization rate is low, the frequency of collisions of uplink and downlink signals is reduced, the number of times the retransmission process takes place is reduced, and the line utilization efficiency is improved.

For example, in FIG. 3, when the period of one slot is 1 ms, the downlink utilization rate of the radio communication system 1 is 5/7 or less, and the downlink delay and jitter requirements are allowed to be 2 ms or more, collisions of uplink and downlink signals can be avoided. Alternatively, when the uplink utilization rate of the other radio communication system 2 is ½ or less and the delay and jitter requirements are allowed to be 8 ms or more, collisions of uplink and downlink signals can be avoided. Also, even when slots which do not fit the above conditions and in which uplink and downlink signals might collide are used, the probability of collision can be reduced by not using some of these slots.

As described above, according to the embodiment of the present invention, it is possible to reduce the deterioration of communication quality due to interference between uplink slots and downlink slots in a radio communication system using a TDD scheme.

SUMMARY OF EMBODIMENT

This specification discloses at least the radio communication method and the radio communication system according to the following items.

(Item 1)

A radio communication method performed by a radio communication system using a TDD scheme, the radio communication method including:

an acquisition step of acquiring a TDD configuration of another radio communication system that might have an overlapping communication area;

a determination step of determining priorities of slots of the radio communication system, based on the acquired TDD configuration, such that a priority of a first slot, in which an uplink slot timing and a downlink slot timing overlap those of the another radio communication system, is lower than a priority of a second slot, in which the uplink slot timing and the downlink slot timing do not overlap those of the another radio communication system; and an allocation step of allocating resources to the slots of the radio communication system according to the priorities of the slots.

(Item 2)

The radio communication method according to Item 1, wherein the first slot also includes:

a third slot, in which the uplink slot timing in the radio communication system overlaps a downlink slot timing in the another radio communication system; and a fourth slot, in which the downlink slot timing in the radio communication system overlaps an uplink slot timing in the another radio communication system, and wherein the determination step includes determining a priority of the third slot and a priority of the fourth slot to be different priorities.

(Item 3)

The radio communication method according to Item 1 or 2, wherein the allocation step includes allocating the resources to slots having higher slot priorities, in descending order of resources having higher packet priorities.

(Item 4)

The radio communication method according to any one of Items 1 to 3, wherein the acquisition step includes acquiring the TDD configuration of the another radio communication system by snooping radio waves transmitted by the another radio communication system.

(Item 5)

The radio communication method according to any one of Items 1 to 3, wherein the acquisition step includes sharing resource allocation information with the another radio communication system, and wherein, when a timing of a slot in which the another radio communication system transmits a high-priority packet and a timing of a slot in which the radio communication system transmits a low-priority packet having a lower priority than the high-priority packet overlap, the radio communication system cancels transmission of the low-priority packet.

(Item 6)

The radio communication method according to any one of Items 1 to 5, wherein the another radio communication system synchronizes with the radio communication system and uses a same frequency band.

(Item 7)

A radio communication system using a TDD scheme, including:

an acquisition unit configured to acquire a TDD configuration of another radio communication system that might have an overlapping communication area;

a priority determination unit configured to determine priorities of slots of the radio communication system, based on the acquired TDD configuration, such that a priority of a first slot, in which an uplink slot timing and a downlink slot timing overlap those of the another radio communication system, is lower than a priority of a second slot, in which the uplink slot timing and the downlink slot timing do not overlap those of the another radio communication system; and a resource allocation unit configured to allocate resources to the slots of the radio communication system according to the priorities of the slots.

Although the present embodiment has been described above, the present invention is not limited to such a specific embodiment, and various modifications and changes can be made within the scope of the gist of the present invention described in the claims.

REFERENCE SIGNS LIST

1 Radio communication system
2 Another radio communication system
111, 121 Communication area
302 TDD configuration
401 Acquisition unit
402 Priority determination unit
403 Resource allocation unit

The invention claimed is:

1. A radio communication method to be performed by a first radio communication system using a time division duplex scheme, the radio communication method comprising:

receiving information indicating a time division duplex configuration of a second radio communication system having a communication area that overlaps a communication area of the first radio communication system;

setting a priority of a first slot, in which an uplink slot timing in the first radio communication system overlaps a downlink slot timing in the second communication system or a downlink slot timing in the first radio communication system overlaps an uplink slot timing in the second communication system, to be lower than a priority of a second slot, in which the uplink slot timing in the first radio communication system does not overlap the downlink slot timing in the second radio communication system or the downlink slot timing in the first radio communication system does not overlap the uplink slot timing in the second communication system, based on the time division duplex configuration acquired with respect to the second radio communication system; and allocating resources to the slots of the first radio communication system according to the priorities of the slots, wherein the first slot also includes one or both of:

a third slot, in which the uplink slot timing in the first radio communication system overlaps a downlink slot timing in the second radio communication system; and a fourth slot, in which the downlink slot timing in the first radio communication system overlaps an uplink slot timing in the second radio communication system, and wherein, when the first slot includes the third slot and the fourth slot, a priority of the third slot is set to be lower than the priority of the second slot and a priority of the fourth slot is set to be lower than the priority of the third slot.

2. The radio communication method according to claim 1, wherein the resources are allocated to slots having higher slot priorities, in descending order of resources having higher packet priorities.

3. The radio communication method according to claim 1, wherein the information indicating the time division duplex configuration of the second radio communication system is received by snooping radio waves transmitted by the second radio communication system.

4. The radio communication method according to claim 1, wherein the first radio communication system shares resource allocation information with the second radio communication system, and wherein, when a timing of a slot in which the second radio communication system transmits a high-priority packet and a timing of a slot in which the first radio communication system transmits a low-priority packet having a lower priority than the high-priority packet overlap, the first radio communication system cancels transmission of the low-priority packet.

5. The radio communication method according to claim 1, wherein the second radio communication system synchronizes with the first radio communication system and uses a frequency band that is same as a frequency band of the first radio communication system.

6. A first radio communication system using a time division duplex scheme, the first radio communication system comprising:

a receiver configured to receive information indicating a time division duplex configuration of a second radio communication system having a communication area that overlaps a communication area of the first radio communication system; and a processor configured to set a priority of a first slot, in which an uplink slot timing in the first radio communication system overlaps a downlink slot timing in the second communication system or a downlink slot timing in the first radio communication system overlaps an uplink slot timing in the second communication system, to be lower than a priority of a second slot, in which the uplink slot timing in the first radio communication system does not overlap the downlink slot timing in the second radio communication system or the downlink slot timing in the first radio communication system does not overlap the uplink slot timing in the second communication system, based on the time division duplex configuration acquired with respect to the second radio communication system, wherein the processor is configured to allocate resources to the slots of the first radio communication system according to the priorities of the slots, wherein the first slot also includes one or both of:

a third slot, in which the uplink slot timing in the first radio communication system overlaps a downlink slot timing in the second radio communication system; and a fourth slot, in which the downlink slot timing in the first radio communication system overlaps an uplink slot timing in the second radio communication system, and wherein, when the first slot includes the third slot and the fourth slot, the processor set a priority of the third slot to be lower than the priority of the second slot and a priority of the fourth slot to be lower than the priority of the third slot.

* * * * *